US010983084B2

(12) United States Patent
Nishio et al.

(10) Patent No.: US 10,983,084 B2
(45) Date of Patent: Apr. 20, 2021

(54) ELECTRODE DEVICE

(71) Applicant: HORIBA Advanced Techno, Co., Ltd., Kyoto (JP)

(72) Inventors: Yuji Nishio, Kyoto (JP); Katsunobu Ehara, Kyoto (JP)

(73) Assignee: HORIBA Advanced Techno, Co., Ltd., Kyoto (JP)

(*) Notice: Subject to any disclaimer, the term of this patent is extended or adjusted under 35 U.S.C. 154(b) by 42 days.

(21) Appl. No.: 16/355,395

(22) Filed: Mar. 15, 2019

(65) Prior Publication Data
US 2019/0285566 A1   Sep. 19, 2019

(30) Foreign Application Priority Data

Mar. 16, 2018  (JP) .............................. JP2018-050153
Mar. 20, 2018  (JP) .............................. JP2018-052229

(51) Int. Cl.
*G01N 27/30*   (2006.01)
*G01N 27/36*   (2006.01)
(Continued)

(52) U.S. Cl.
CPC ......... *G01N 27/302* (2013.01); *B08B 7/0057* (2013.01); *G01N 27/36* (2013.01); *G01N 27/38* (2013.01)

(58) Field of Classification Search
CPC ........... G01N 27/4166; G01N 27/4167; G01N 27/301; G01N 27/302; G01N 27/333;
(Continued)

(56) References Cited

U.S. PATENT DOCUMENTS

| | | | |
|---|---|---|---|
| 4,028,196 A | 6/1977 | Young | |
| 2009/0236224 A1* | 9/2009 | Yamasato | G01N 27/36 204/415 |

(Continued)

FOREIGN PATENT DOCUMENTS

| | | | |
|---|---|---|---|
| CN | 107656464 A * | 2/2018 | ............. G01N 27/36 |
| DE | 102011014897 A1 | 9/2012 | |
| JP | 5121012 A | 1/2013 | |

OTHER PUBLICATIONS

English Machine Translation of CN 107656164 (Year: 2018).*

(Continued)

*Primary Examiner* — Gurpreet Kaur
(74) *Attorney, Agent, or Firm* — Alleman Hall Creasman & Tuttle LLP

(57) ABSTRACT

This invention is to provide an electrode device whose manufacturing cost is suppressed and whose surface is difficult to be polluted. The electrode device comprises an internal electrode, an enclosure that houses the internal electrode, an internal solution that is housed in the enclosure and that electrically communicates a liquid junction formed in the enclosure or a response glass that forms a part or all of the enclosure with the internal electrode, and an antifouling mechanism that has a light source to irradiate ultraviolet rays on a sample contact surface of the enclosure as being a surface that makes contact with a sample and that prevents the sample contact surface of the enclosure from being polluted, and the light source is directly or indirectly mounted on an outside of the enclosure, or the light source is housed inside of the enclosure.

9 Claims, 5 Drawing Sheets

(a) REFERENCE    (b) TiO₂ COATING ONLY    (c) UV ONLY    (d) TiO₂ COATING + UV

(51) Int. Cl.
B08B 7/00 (2006.01)
G01N 27/38 (2006.01)

(58) Field of Classification Search
CPC .. G01N 27/3335; G01N 27/416; G01N 27/36; G01N 27/38; B08B 7/0057
See application file for complete search history.

(56) References Cited

U.S. PATENT DOCUMENTS

2011/0186447 A1    8/2011  Boeck et al.
2011/0308303 A1   12/2011  Omoda
2015/0027887 A1*  1/2015  Lee .................... G01N 27/3335
                                                            204/406

OTHER PUBLICATIONS

European Patent Office, Extended European Search Report Issued in Application No. 19163186.0, dated Jul. 16, 2019, Germany, 10 pages.

* cited by examiner

ELECTRODE DEVICE

FIELD OF THE ART

This invention relates to an electrode device comprising an antifouling mechanism by the use of ultraviolet rays.

BACKGROUND ART

For example, in case of continuously monitoring an electrochemical property such as a pH of a sample in order to investigate quality of water, an electrode device such as a measurement electrode or a reference electrode might be continuously immersed in a sample solution for a log period of time.

Since various pollutants or microorganisms exist in the sample solution such as environmental water, if the electrode device is continuously immersed in the sample solution for a long time, a surface of the electrode device is polluted so that an adverse effect might be exerted on accuracy of a measurement such as a pH measurement.

Then, conventionally, for the above-mentioned electrode device, as shown in the patent document 1, it has been conceived that a surface of the electrode device that makes contact with the sample is coated with a thin film made of titanium dioxide having catalytic property to decompose pollutant in order to prevent the surface of the electrode device from being polluted.

In order to prevent pollution on the surface of the electrode device by the coating, it is necessary to irradiate ultraviolet rays on the thin film to activate the catalytic property of the titanium dioxide contained in the thin film.

Accordingly, conventionally the ultraviolet rays are irradiated on the surface of the electrode device by a light source arranged separately from the electrode device in order to activate the catalytic property of the titanium dioxide.

However, it is necessary for the above-mentioned conventional electrode device to arrange the light source so as to make it possible to irradiate the ultraviolet rays on a desired position of the surface of the electrode device. Then there is a problem that it takes time to assemble the electrode device or the light source.

In addition, for example, in case that the electrode device is used in a state of being immersed in the sample having property of fluidity, since there is a risk that a position of the electrode device or the light source gradually changes due to the flow of the sample, there is a problem that it takes time to conduct maintenance such that it is necessary to verify or adjust the position of the electrode device or the light source while in use.

PRIOR ART DOCUMENTS

Patent Document

Patent document 1: Japanese Patent No. 5121012

SUMMARY OF THE INVENTION

Problems to be Solved by the Invention

This invention intends to solve all of the problems and an object of this invention is to provide an electrode device whose surface is difficult to be polluted and that is free from troublesome assembling or maintenance.

Means to Solve the Problems

More specifically, the electrode device in accordance with this invention comprises an internal electrode, an enclosure (also called housing) that houses the internal electrode, an internal solution (also called internal liquid) that is housed in the enclosure and that electrically communicates a liquid junction formed in the enclosure or a response glass that forms a part or all of the enclosure with the internal electrode, and an antifouling mechanism that has a light source to irradiate ultraviolet rays on a sample contact surface of the enclosure as being a surface that makes contact with a sample and that prevents the sample contact surface of the enclosure from being polluted, and is characterized by that the light source is directly or indirectly mounted on an outside of the enclosure, or the light source is housed inside of the enclosure.

In accordance with the electrode device having this arrangement, since the light source is directly or indirectly mounted on the outside of the enclosure, or the light source is housed in the inside of the enclosure, it is possible to omit a process of preparing a light source and assembling the separately prepared light source.

In addition, for example, it is possible to continuously and securely irradiate the ultraviolet rays on the desired position of the enclosure without requiring troublesome labor even though the electrode device is placed in the flowing sample.

It is possible for the ultraviolet rays to decompose organic substances or to kill microbial organism as being a main cause of the pollution of the electrode device by the ultraviolet rays' own property, even though there is no thin film made of titanium dioxide.

As a result of this, in order to suppress a manufacturing cost, it is also possible to make the electrode device without coating the surface of the enclosure with titanium dioxide.

If the electrode device is characterized by that the enclosure and the internal solution have transparency or translucency and the light source is housed inside of the enclosure, even though the sample has a property of being difficult to transmit the light, it is possible to irradiate the ultraviolet rays emitted from the light source on the sample contact surface of the enclosure while keeping a sufficient light intensity.

If the response glass contains 40 mol % or more silicon dioxide, it is possible to suppress adhesion of stein on the surface of the response glass that makes contact with the sample by effectively transmitting the ultraviolet light from the light source while keeping durability of the response glass.

In case that the electrode device has a function as the reference electrode, it is conceivable that the liquid junction is provided on a portion of the enclosure that makes contact with the sample.

In case that the liquid junction is formed by a small through bore formed on the enclosure or a porous body such as ceramics arranged inside of a through bore, stein tends to attach especially to the liquid junction or its periphery.

If the stein attaches to the liquid junction or its periphery and conduction is cut off between the sample and the internal solution on the liquid junction, it is not possible to conduct a pH measurement accurately.

If the light source is so arranged to emit the light in a direction of the liquid junction, since the ultraviolet rays from the light source are irradiated easily on the liquid junction, it is possible to suppress adhesion of the stein to the liquid junction or its periphery.

If the enclosure is tubular, the light source is arranged at a position to irradiate the ultraviolet rays on the liquid junction or the response glass, and the internal electrode is arranged across a position of the light source on an opposite end side to an end of a side near the liquid junction or the response glass of the enclosure, even though the internal electrode is an electrode such as a silver/silver chloride electrode susceptible by the ultraviolet rays, since the ultraviolet rays from the light source are difficult to be irradiated on the internal electrode, it is possible to prevent deterioration of the internal electrode by irradiation of the ultraviolet rays.

Effect of the Invention

In accordance with this invention, since the light source is directly of indirectly mounted on the outside of the enclosure or the light source is housed inside of the enclosure, it is possible to omit a process of preparing a light source and assembling the separately prepared light source.

In addition, for example, it is possible to continuously and securely irradiate the ultraviolet rays on the desired position of the enclosure without requiring troublesome labor even though the electrode device is placed in the flowing sample.

It is possible for the ultraviolet rays to decompose organic substances or to kill microbial organism as being a main cause of the pollution of the electrode device by the ultraviolet rays' own property, even though the electrode device is not provided with the thin film made of titanium dioxide.

As a result of this, in order to suppress a manufacturing cost, it is also possible to make the electrode device without coating the surface of the enclosure with titanium dioxide.

MODE FOR EMBODYING THE INVENTION

One embodiment of this invention will be explained with reference to drawings.

An electrode device 1 in accordance with this embodiment is used for an electrochemical measurement device 100 that measures a pH or a concentration of various ions in a sample such as, for example, industrial waste water, discharged water from a water treatment plant, river water or lake water.

Figure 1:
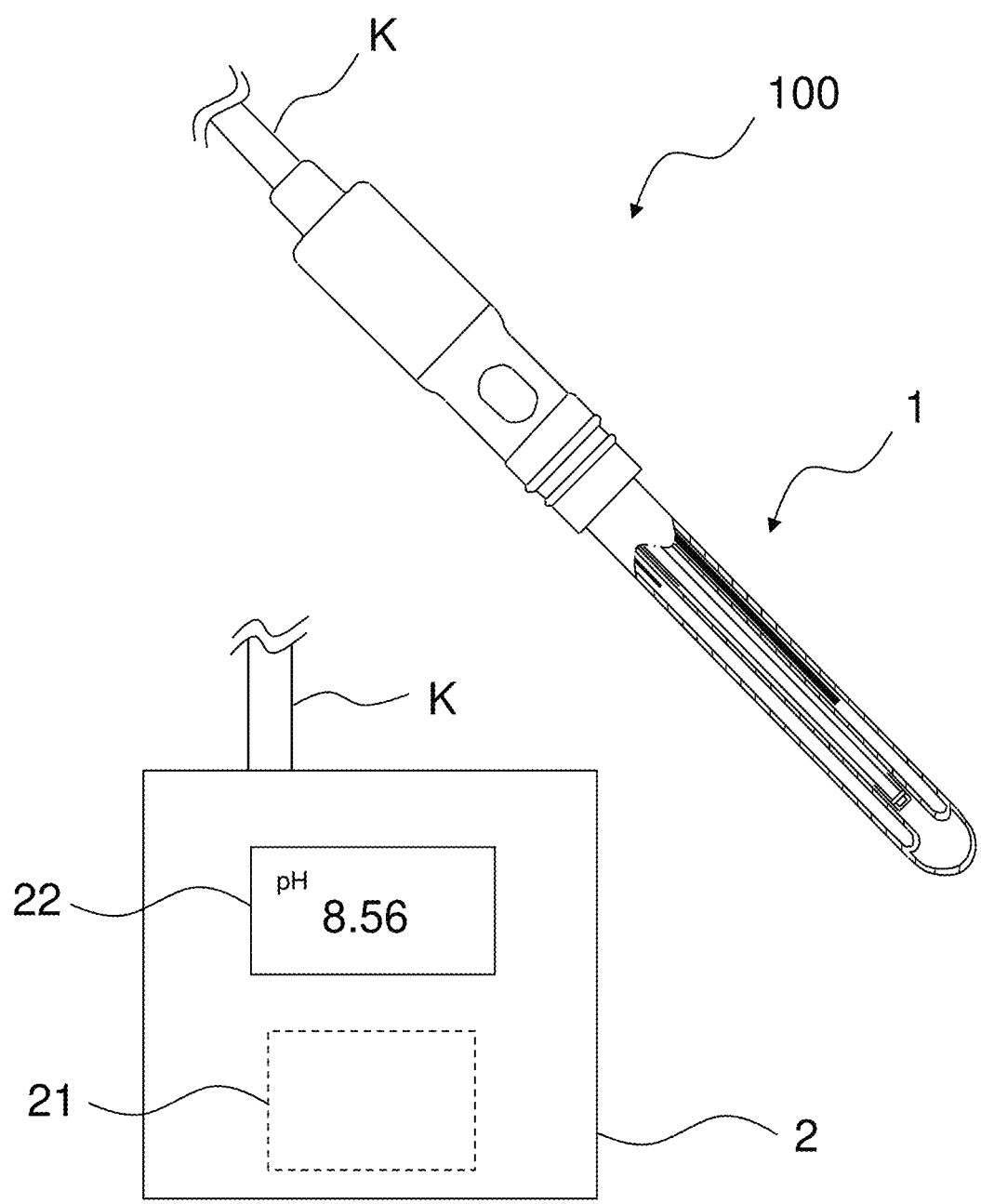
FIG. 1 is a pattern view showing whole of an electrochemical measurement device in accordance with one embodiment of this invention.

The electrochemical measurement device 100 comprises, for example, as shown in FIG. 1, the electrode device 1 that outputs the ion concentration or the like in the sample as an electrical signal by making contact with the above-mentioned sample and a measurement device body part 2 having an information processing circuit 21 that receives an output signal from the electrode device 1, converts the received output signal into desired information and outputs the information and a display part 22 that displays the information output by the information processing circuit 21.

Figure 2:
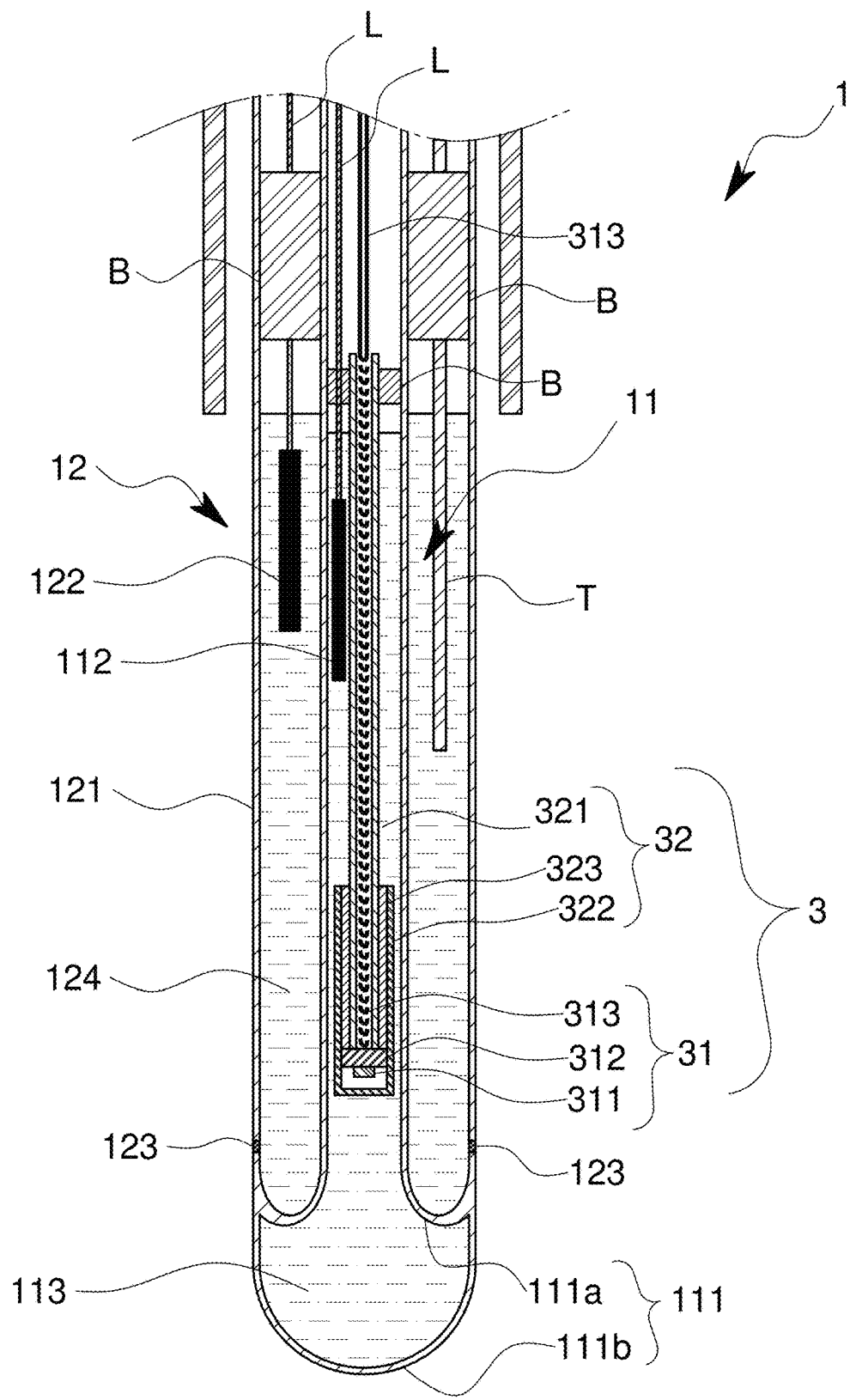
FIG. 2 is a pattern view showing an end surface of an electrode device in accordance with this embodiment.

In this embodiment, the electrode device 1 is a dome-shaped composite electrode with no big convexoconcave on its side surface and comprises, as shown in FIG. 2, a glass electrode 11 to measure, for example, a pH and a reference electrode 12 arranged integrated with the glass electrode 11 to surround a circumference of the glass electrode 11.

The glass electrode 11 comprises, a cylindrical glass electrode enclosure (also called a cylindrical glass electrode housing) 111 made of, for example, transparent glass, and an internal electrode for measurement 112 housed inside of the glass electrode enclosure 111.

The glass electrode enclosure 111 comprises a glass electrode supporting tube 111a made of glass and a hemisphere response glass 111b integrated with a distal end part of the glass electrode supporting tube 111a and airtightly connected by welding or the like.

It is preferable that the response glass 111b or a supporting glass that forms the glass electrode supporting tube 111a contains, for example, silica of 40 mol % or more. It is acceptable that the above-mentioned supporting glass or the response glass 111b contains silica of 40 mol % or more, however, it is preferable it contains silica of 50 mol % or more, and more preferably 60 mol % or more.

More concretely, the supporting tube glass or the response glass 111b contains one or more than one kind of the substance of 70 mol % or more, more preferably 80 mol % or more selected from a group comprising $SiO_2$, $Al_2O_3$, $Li_2O$, $Na_2O$ and $K_2O$.

The supporting tube glass or the response glass 111b may contain one or more than one kind of the substance of 80 mol % or more, more preferably 90 mol % or more selected from a group comprising $SiO_2$, $Al_2O_3$, an alkali metal oxide and an alkali earth metal oxide.

The supporting tube glass or the response glass 111b may contain one or more than one kind of the substance of 90 mol % or more, more preferably 95 mol % or more selected from a group comprising $SiO_2$, $Al_2O_3$, an alkali metal oxide, an alkali earth metal oxide, $B_2O_3$, a lead (Pb) oxide, $Y_2O_3$, $La_2O_3$, $Ta_2O_5$, $ZrO_2$ and $TiO_2$.

It is preferable that the supporting tube glass or the response glass 111b is made of content of a transition metal oxide of 1 mol % or less as being a colored substance such as chrome, manganese, iron, cobalt, nickel, copper and content of an oxide other than transition metal of 99 mol % or more.

As explained above, the supporting tube glass or the response glass 111b may contain a transparent composition such as a transparent metal oxide of 95 mol % or more, more preferably 97 mol % or more.

For example, a KCl solution is housed in the glass electrode enclosure 111 as a glass electrode internal solution 113 that electrically connects the internal electrode for measurement 112 to the response glass 111b.

The internal electrode for measurement 112 is, for example, a silver/silver chloride electrode, and is electrically connected to the measurement device body part 2 through, for example, a lead wire (L) or a cable (K).

The internal electrode for measurement 112 is covered except for a part thereof by a covering material such as a sheet or a film made of a substance such as, for example, resin that intercepts or absorbs ultraviolet rays. The substance of the covering material is not particularly limited to this as far as the covering material can reduce an amount of the ultraviolet rays irradiated on the internal electrode for measurement 112. In addition, a way to cover the internal electrode for measurement 112 may be so that an outside of the internal electrode for measurement 112 is covered by the covering material, or the outside of the internal electrode for measurement 112 is coated by the covering material.

If whole of the internal electrode for measurement 112 is covered by the covering material without any gap, conduction between the internal electrode for measurement 112 and the glass electrode internal solution 113 might be cut off. Then, the covering material is made to be a cylindrical shape having a bore or opening to secure the conduction at a distal end part of the internal electrode for measurement 112.

A position where the bore is formed is not limited to the distal end part of the internal electrode for measurement 112, and may be any position of the covering material as far as the internal electrode for measurement 112 can make contact with the glass electrode internal solution 113.

The reference electrode 12 comprises a cylindrical reference electrode enclosure (also called a cylindrical reference electrode housing) 121 made of, for example, the above-mentioned support tube glass or the like, an internal electrode for reference 122 housed inside of the reference electrode enclosure 121, and a liquid junction 123 comprising a through bore, or porous ceramics or capillaries mounted on the inside of the through bore that penetrates through the reference electrode enclosure 121 in a thickness direction and that opens on the surface of the reference electrode enclosure 121 that makes contact with the sample.

A enclosure of the composite electrode 1 in accordance with this embodiment is formed by arranging the reference electrode enclosure 121 to surround an outer circumference of the glass electrode enclosure 111 and by airtightly connecting the glass electrode enclosure 111 to the reference electrode enclosure 121 near a connecting portion between the glass electrode supporting tube 111a and the response glass 111b by welding or the like.

A distal end side of the response glass 111b projects from a distal end part of the reference electrode enclosure 121.

The liquid junction 123 is formed, for example, near a connecting portion between the glass electrode enclosure 111 and the reference electrode enclosure 121.

The internal electrode for reference 122 is housed in a space formed between an inner circumferential surface of the reference electrode enclosure 121 and an outer peripheral surface of the glass electrode enclosure 111.

In addition, a transparent polymer gel containing, for example, a KCl solution as being a reference electrode internal solution 124 that electrically connects the internal electrode for reference 122 to the sample through the liquid junction 123 is housed in the space.

The internal electrode for reference 122 is, for example, a silver/silver chloride electrode, and is electrically connected to the measurement device body part 2 through, for example, the lead wire (L) or the cable (K).

Similar to the internal electrode for measurement 112, the internal electrode for reference 122 is covered by a covering material that intercepts or absorbs the ultraviolet rays such as, for example, a sheet or a film made of a resin.

The internal electrode for reference 122 is further covered by a resin or the like that restrains fluidity of the reference electrode internal solution 124.

The composite electrode 1 in accordance with this embodiment further comprises an antifouling mechanism 3 that irradiates the ultraviolet rays on a sample contact surface as being a surface, of the reference electrode enclosure 121 and the glass electrode enclosure 111, that makes contact with the sample.
In this embodiment, the sample contact surface indicates an outer surface of the composite electrode enclosure from a distal end formed by the response glass 111b of the composite electrode 1 to a height including whole of the liquid junction 123.

The antifouling mechanism 3 comprises, for example, a light source part 31 and a mounting mechanism 32 to mount the light source part 31 indirectly on the glass electrode enclosure 111 or the reference electrode enclosure 121.

The light source part 31 comprises a light source 311 that emits the ultraviolet rays, a substrate 312 on which the light source 311 is mounted and a connection line 313 that connects the light source 311 to a power supply device, not shown in drawings.

The light source 311 is LED chips (light-emitting diode chips) that emit the light whose wavelength is, for example, 400 nm or less, and more preferably 370 nm or less.

The wavelength of the light emitted from the light source 311 may be 500 nm or less, and, for example, the light also may be a blue light whose wavelength is 500 nm or less or a purple light whose wavelength is 430 nm or less.

In this embodiment used is the ultraviolet rays emitted from the light source 311 whose light intensity is, for example, about 8 $mW/cm^2$ at a position of the outer surface of the response glass 111b of the glass electrode enclosure 111.

More concretely, the light source 311 may emit the light whose light intensity is 1 $mW/cm^2$ or more and 15 $mW/cm^2$ or less, and more preferably the light intensity of 2 $mW/cm^2$ or more and 12 $mW/cm^2$ or less.

The substrate 312 is made of, for example, disk-shaped ceramics.

In this embodiment, a plate surface of the substrate 312 is arranged to be orthogonal to an axial direction of the glass electrode enclosure 111, and the LED chips are mounted on a surface, of the plate surface of the substrate 312, that is closer to the response glass 111b.

The light from the LED chips is made to irradiate from the surface, of the substrate 312, on which the LED chips are mounted toward an end of a side on which the response glass 111b of the composite electrode enclosure is mounted.

The mounting mechanism 32 comprises a cylindrical connection line housing tube 321 inside of which the connection line 313 is housed and a covering tube 322 that covers the light source 31 so that the light source part 31 does not touch the glass electrode internal solution 113.

In this embodiment, the connection line housing tube 321 is, for example, made of cylindrical glass, and a diameter of the connection line housing tube 321 is made to be smaller than the diameter of the substrate 312.

The connection line housing tube 321 is arranged inside of the glass electrode enclosure 111 so that an opening part of the connection line housing tube 321 locating at one end side thereof projects from a liquid level of the glass electrode internal solution 113 filled inside of the glass electrode enclosure 111.

An opening part of the connection line housing tube 321 locating at the other end side thereof is liquid-tightly connected to a surface, of the substrate 312, opposed to a surface on which the light source 311 is mounted.

The covering tube 322 is a cylindrical shape made of transparent glass whose composition is the same as that of the above-mentioned response glass or the support tube glass, and one end of the covering tube 322 is open, and the other end thereof is liquid-tightly closed by a glass plate whose material is the same as that of the side peripheral surface of the covering tube 322.

The covering tube 322 is arranged to cover a part of the connection line housing tube 321, the light source 311 and the substrate 312 from a side of a surface of the substrate 312 on which the light source 311 is mounted.

A space formed between the covering tube 322 and the substrate 312 and a space formed between the covering tube 322 and the connection line housing tube 321 are filled with a molding agent 323 made of resin or the like so that the glass electrode internal solution 113 does not enter through the space.

In this embodiment, the light source 311 is indirectly mounted on the glass electrode enclosure 111 by means of a part of the connection line housing tube 321 held by a cable bushing (B) pushed into and fixed to the inside of the glass electrode enclosure 111.

More concretely, the position of the LED chips is positioned to be closer to an end side opposite to the response glass 111b of the glass electrode enclosure 111 than the liquid junction 123.

A method for manufacturing the composite electrode 1 comprising the antifouling mechanism 3 is as follows.

First, as mentioned above, the reference electrode enclosure 121 is joined with a circumference of the glass electrode enclosure 111, and the glass electrode internal solution 113 is filled into the inside of the glass electrode enclosure 111 and the reference electrode internal solution 124 is filled into the inside of the reference electrode enclosure 121 by a required amount.

Next, the light source part 31 on which the connection line housing tube 321 and the covering tube 322 are mounted is inserted into and fixed to the inside of the glass electrode enclosure 111 from an end of the opposite side to the side formed by the response glass 111b of the glass electrode enclosure 111.

The internal electrode for measurement 112 is inserted between the inner circumferential surface of the glass electrode enclosure 111 and the connection line housing tube 321, and mounted on the enclosure through the lead wire (L) electrically connecting the internal electrode for measurement 112 to the measurement device body part 2 or the cable bushing (B) fixed to the opening part of the glass electrode enclosure 111.

In addition, the internal electrode for reference 122 is inserted between the inner circumferential surface of the reference electrode enclosure 121 and the outer peripheral surface of the glass electrode enclosure 111, and mounted on the enclosure through the lead wire (L) electrically connecting the internal electrode for reference 122 to the measurement device body part 2 or the cable bushing (B) fixed to the opening part of the glass electrode enclosure 121.

In addition, a temperature sensor (T) is inserted between the inner circumferential surface of the reference electrode enclosure 121 and the outer peripheral surface of the glass electrode enclosure 111.

The temperature sensor (T), the internal electrode for measurement 112 and the internal electrode for reference 122 are arranged across the light source part 31 on the opposite end side to the end of the side where the liquid junction 123 and the response glass 111b are arranged, and at least a part of the temperature sensor (T), the internal electrode for measurement 112 and the internal electrode for reference 122 are immersed in the glass electrode internal solution 113 or the reference electrode internal solution 124.

More concretely, whole of the temperature sensor (T), the internal electrode for measurement 112 and the internal electrode for reference 122 are arranged on a position nearer to the opposite side to an end where the response glass 111b of the glass electrode enclosure 111 or the liquid junction 123 are arranged than a position where the length of the glass electrode enclosure 111 or the reference electrode enclosure 121 is halved.

More preferably, whole of the temperature sensor (T), the internal electrode for measurement 112 and the internal electrode for reference 122 are arranged on a position nearer to the opposite side to an end where the response glass 111b of the glass electrode enclosure 111 or the liquid junction 123 are arranged than a position where the length of the glass electrode enclosure 111 or the reference electrode enclosure 121 is trisected.

In accordance with the electrode device 1 having this arrangement, following effect can be produced.

Since the enclosure such as the glass electrode enclosure 111 or the reference electrode enclosure 121, the internal solution such as the glass electrode internal solution 113 or the reference electrode internal solution 124 and the covering tube 322 of the mounting mechanism 32 are made of a transparent material, it is possible to effectively transmit the ultraviolet rays emitted from the light source 311 so that the ultraviolet rays can be irradiated on the outer surface of the enclosure that makes contact with the sample.

Since the light source 311 is housed inside of the glass electrode enclosure 111, even though optical transparency of the sample is low, it is possible to irradiate the ultraviolet rays having sufficient light intensity on the sample contact surface of the compound electrode enclosure.

Especially, since the response glass 111b contains silica of 40 mol % or more, the response glass 111b easily transmits the ultraviolet rays so that it is easy to irradiate the ultraviolet rays on the outside surface of the response glass 111b with which the sample makes contact. If a content amount of silica is much, it is possible to improve durability of the glass while keeping the transmittance of the ultraviolet rays high.

Since the light from the LED chips is emitted from whole surface of the LED chips except for a surface that makes contact with the substrate 312 to the outside and a position where the LED chips are mounted locates across the liquid junction 123 on the opposite side to a side where the response glass 111b is mounted, it is possible to irradiate the ultraviolet rays emitted by the LED chips on whole of the sample contact surface including all of the outer surface of the response glass 111b and all of the liquid junction 123.

Since the composite electrode is dome-type, there is no big uneven part on the surface of the glass electrode enclosure 111 or the reference electrode enclosure 121 that makes contact with the sample, it is possible to minimize a part where the ultraviolet rays are difficult to be irradiated as much as possible.

Since the internal electrode such as the internal electrode for measurement 112 or the internal electrode for reference 122 as being the silver-silver chloride electrode is covered by the covering material that absorbs the ultraviolet rays, it is possible to reduce the ultraviolet rays irradiated on the internal electrode and to prevent a silvering reaction that the silver chloride of the internal electrode is changed to silver ions.

Since the internal electrode for reference 122 is further covered by a resin that suppress fluidity of the reference electrode internal solution 124, it is possible to prevent the silver ions from diffusing in the reference electrode internal solution 124 even though the silver ions liquate out.

As a result of this, it is possible to reduce the risk that the conduction in the liquid junction 123 is cut off due to deposit of the silver ions on the liquid junction 123.

Since the light source 31 of the antifouling mechanism 3 comprises the LED chips as being the light source 311, there is little limit to a position where the light source 311 is mounted due to a size of the light source 311 so that it is possible to arrange the light source 31 inside of the enclosure without especially increasing the size of the glass electrode enclosure 111.

Since the mounting mechanism 32 comprises the covering tube 322 and the connection line housing tube 321, it is possible to arrange the LED chips used for the light source part 31 and the connection line 313 that supplies electric power to the LED chips in the inside of the glass electrode enclosure 111 without being immersed in the glass electrode internal solution 113.

As a result of this, there is no need of using especial LED chips or the connection line 313 that can be used in water and it is possible to use commercially available LED chips without worrying about failure or earth leakage.

Since the internal electrode for measurement 112 and the internal electrode for reference 122 are arranged across the light source part 31 on the opposite end side to the end of the side where the liquid junction 123 and the response glass 111b are arranged, it is possible to restrain the ultraviolet rays emitted from the light source 311 from being irradiated on the internal electrode for measurement 112 and the internal electrode for reference 122.

As a result of this, it is possible to restrain the silvering reaction of the internal electrode for measurement 112 and the internal electrode for reference 122 because of irradiation of the ultraviolet rays.

Since the light source 311 and the internal electrode for measurement 112, the internal electrode for reference 122 and the temperature sensor (T) are separated by a sufficient distance, even though the light source 311 generates heat, it is possible to suppress the influence of the heat on the internal electrode for measurement 112, the internal electrode for reference 122 and the temperature sensor (T).

This invention is not limited to the above-mentioned embodiment.

Figure 3:
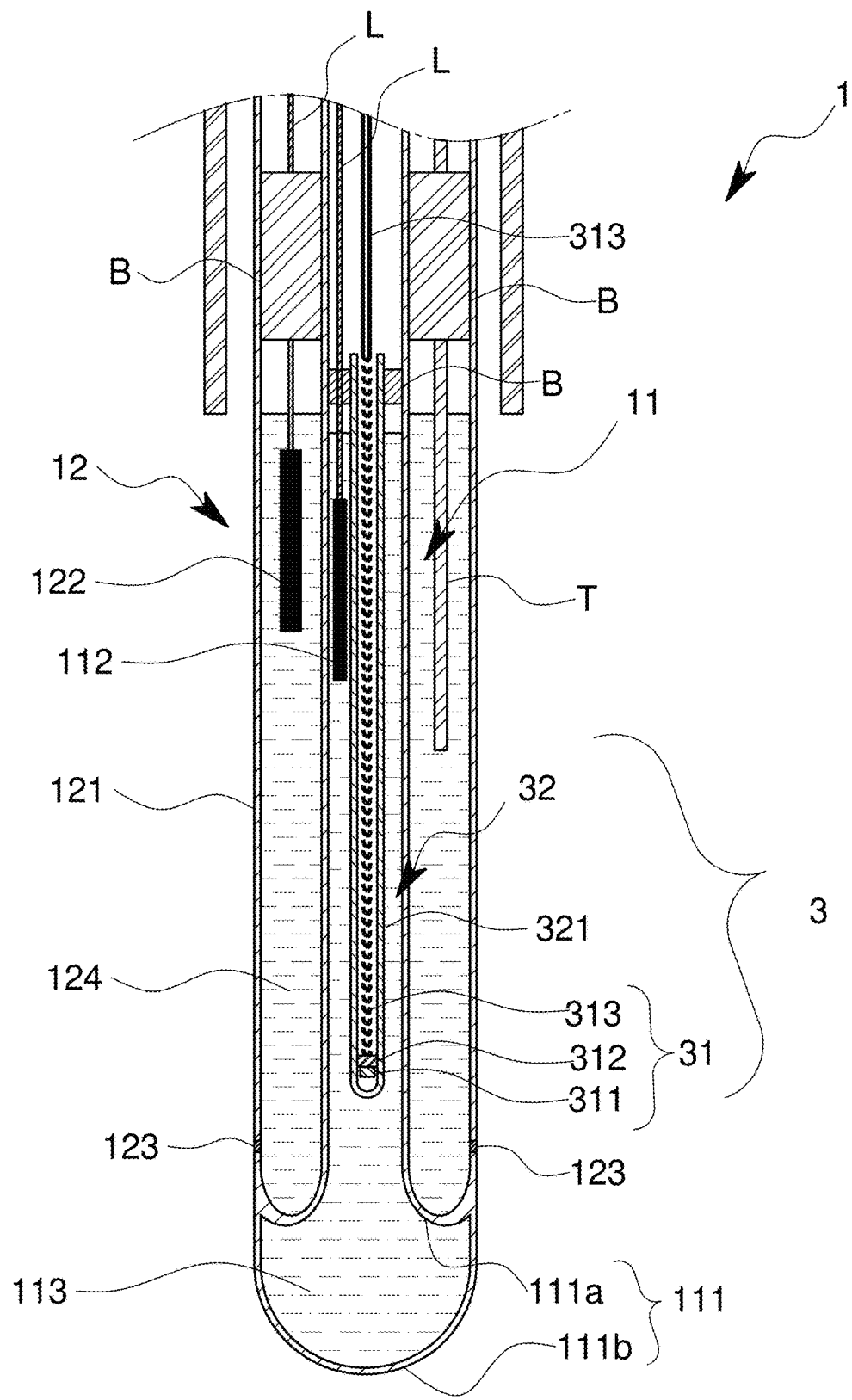
FIG. 3 is a pattern view showing the electrode device in accordance with another embodiment of this invention.

For example, the covering tube 322 that covers the light source 31 is not an essential component, and it may be so that the connection line housing tube 321 covers both the connection line 313 and the light source part 31, as shown in FIG. 3.

Figure 4:
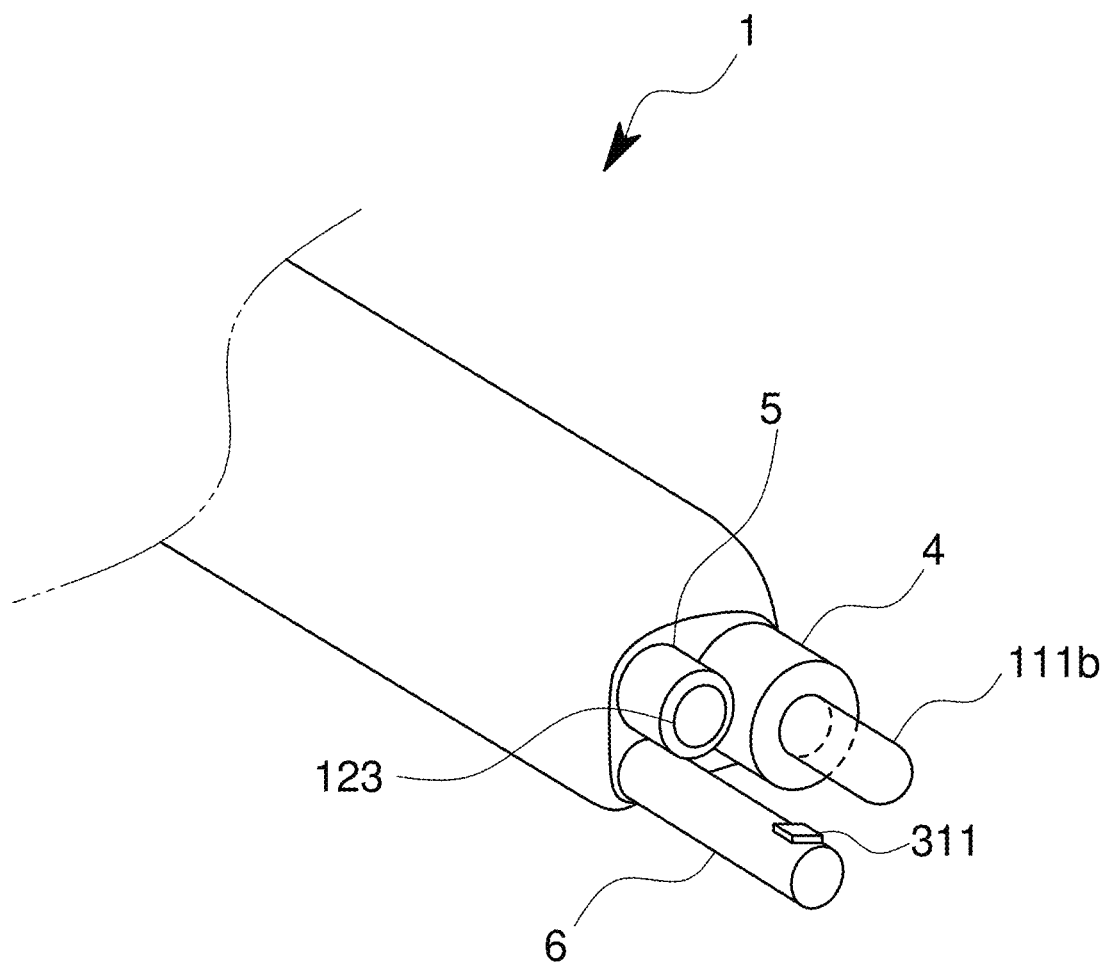
FIG. 4 is a pattern view showing the electrode device in accordance with further different embodiment of this invention.

The composite electrode is not limited to the above-mentioned type, and may be a chip type wherein the response glass 111b and the liquid junction 123 are easily detachably mounted on the outside of the enclosure, as shown in FIG. 4.

In case that the composite electrode is the chip type, the light source part 31 may be detachably mounted on the outside of the enclosure so as to make it possible to be changed from the outside.

Concretely, for example, the composite electrode may be represented by comprising a response glass chip 4 made of resin that communicates the inside of the glass electrode supporting tube 111a to the inside of the dome-shaped response glass 111b, and a liquid junction chip 5 as being a cylindrical cup made of resin a part of whose wall formed is the liquid junction 123 and that communicates the inside of the reference electrode enclosure 121 to the inside of the cylindrical cup.

The response glass chip 4 and the liquid junction chip 5 are mounted through, for example, a screwing structure on an end part of the enclosure that makes contact with the sample solution.

In this modified embodiment, similar to the response glass chip 4 or the liquid junction chip 5, the light source part 31 comprising the LED chips that can be used also in the water as being the light source 311 is fixed to a surface, facing the response glass 111b and the liquid junction 123, of the light source supporting tube 6.

The light source supporting tube 6 corresponds to the mounting mechanism 32, and is a thin cylindrical shape inside of which the connection line 313 is housed and on a distal end part of which the light source 311 is mounted.

As mentioned above, since the light source part 31 is indirectly mounted on the outside of the enclosure, it is possible to make it easy to irradiate the ultraviolet rays from the light source 311 on the response glass 111b and the liquid junction 123.

In addition, since the light source part 31 can be easily exchanged from the outside, it is easy to conduct maintenance of the light source part 31.

Although also for the composite electrode of the chip type, if the enclosure, the response glass chip 4 and the liquid junction chip 5 are transparent, it is a matter of course that the light source part 31 may be arranged inside of the enclosure as mentioned in the first embodiment.

It is not limited to that the light source part 31 is so arranged that the LED chips as being the light source 311 are directly connected to the connection line 313, and may be that the light source part 31 is a wireless power feeding type.

Concretely, the light source part 31 may further comprise a wireless power supply mechanism comprising a receiving part incorporated into the LED chips and a transmitting part that transmits electric power to the receiving part.

Since the electric power transmission is conducted by, for example, magnetic resonance between the receiving part and the transmitting part of the wireless power supply mechanism, even though the distance between the receiving part and the transmitting part is about 30 cm, it is possible to supply the electric power to the LED chips.

Concretely, for example, the LED chips incorporating the receiving part may be placed in the gelled glass electrode internal solution 113 filled inside of the glass electrode enclosure 111, and the transmitting part may be mounted on a part in the cable (K) side of the connector that connects the lead wire (L) that is connected to the internal electrode for measurement 112, the internal electrode for reference 122 and the temperature sensor (T) to the cable (K).

In addition to this, the transmitting part may be mounted on a part in the enclosure side of the connector, or the transmitting part may be mounted on an electrode holder to fix the composite electrode to the inside of the sample.

If the light source part 31 of the wireless power supplier type is adopted, since there is no need of inserting the connection line 313 into the inside of the enclosure of the glass electrode or the reference electrode, it is not necessary to secure a space for housing the connection line 313 in the inside of the enclosure so that it is possible to downsize the enclosure as much as possible.

A receiving side part, of the wireless power supply type light source part 31, comprising the LED chips, the substrate 312 and the receiving part is a cube shape whose one side is about 4.5 mm so that it can be mounted freely at a desired place of the enclosure.

In addition, since there is no need of devising the connection line 313 not to touch the internal solution, it becomes easier to manufacture the electrode device 1.

Furthermore, since it is also possible to use the LED chips of the wireless power supply type in water, flexibility of a method for mounting the light source part 31 on the enclosure can be drastically improved such that the LED chips float on the internal solution or are used in a state of just being immersed in the internal solution.

In the above-mentioned embodiment, the light source part 31 is indirectly mounted on the enclosure, however, it may be directly mounted on the enclosure.

It is not limited that the LED chips as being the light source 311 are mounted toward an end at a side formed by the response glass 111b of the enclosure, and the LED chips may be mounted toward various directions tailored to a place on which the ultraviolet rays are irradiated or a usage of the LED chips.

For example, the LED chips as being the light source 311 may be mounted on a surface of the response glass 111b that makes contact with the glass electrode internal solution 113 to face toward a direction opposite to a distal end of the response glass 111b.

The covering tube 322, the connection line housing tube 321 and the light source supporting tube 6 constituting the mounting mechanism 32 are acceptable as far as the light source part 31 can be mounted on the enclosure, and are not limited to be made of a material having rigidity such as glass, and may be made of a material having elasticity or flexibility such as rubber-shaped or string-shaped material.

The internal solution 113 for glass electrode 11 and the internal solution 124 for reference electrode 12 are not necessarily the same, and may be appropriately changed. These internal solutions are not limited to the above-mentioned gelled, and may be liquid.

The glass electrode enclosure 111 is not limited to the above-mentioned arrangement wherein a part of the glass electrode enclosure 111 is formed by the response glass 111b and may be whole of the glass electrode enclosure 111 is formed by the response glass 111b.

The light source 311 may be mounted on the reference electrode enclosure 121.

In addition, the electrode device 1 is not limited to the above-mentioned composite electrode, and the electrode device 1 may comprise the glass electrode 11 and the reference electrode 12 each of which is independently arranged.

The sample contact surface is a surface of the electrode device 1 that makes contact with the sample solution and that might be polluted by the sample solution. In addition to this, as concrete examples represented are, for example, a part or all of the outer surface of the composite electrode enclosure, a part or all of the glass electrode enclosure, a part or all of the outer surface of the response glass, and a part or all of the reference electrode enclosure including a part or all of the liquid junction.

More concretely, the sample contact surface indicates all of the outer surface of the enclosure of the composite electrode, the glass electrode enclosure 111 and the reference electrode enclosure 121, an outer surface of the enclosure from a distal end locating in the opposite side to a side where the enclosure is connected to the measurement device body part 2 through the cable (K) to about half of the length of the enclosure, or an outer surface of the enclosure from a distal end of the enclosure which is immersed (submerged) in the sample solution to about one third of the length of the enclosure.

The ultraviolet rays irradiated from the light source 311 is not limited to the above-mentioned, and may be any as far as it can irradiate the light whose light intensity is 2 mW/cm$^2$ or more that is almost the same light intensity of the outdoor sunlight on the surface of the response glass 111b.

As a matter of fact, it has been confirmed by an experiment that a sufficient antifouling effect can be obtained if the light intensity of the ultraviolet rays emitted from the light source 311 on the outer peripheral surface of the response glass 111b is 0.5 mW/cm$^2$ or more.

As a result of this, it can be conceived that a sufficient antifouling effect can be produced if the light intensity of the ultraviolet rays emitted from the light source 311 on the sample contact surface of the enclosure is 0.5 mW/cm$^2$ or more.

In addition, depending on a condition if the light intensity of the irradiated ultraviolet rays is too strong, there might be a case that the silvering reaction of the internal electrode such as the internal electrode for measurement 112 or the internal electrode for reference 122 occurs, the electrochemical measurement is influenced by the temperature or bubbles generate. As a result of this, it is preferable that the light intensity of the ultraviolet rays irradiated on the sample contact surface of the enclosure is 0.5 mW/cm$^2$ or more and 3.5 mW/cm$^2$ or less, and more preferably 1.0 mW/cm$^2$ or more and less than or equal to 3.0 mW/cm$^2$ or less.

In the above-mentioned embodiment, a case is also described that no thin film made of titanium dioxide is coated on the sample contact surface, however, if the sample contact surface is coated with titanium dioxide, it is possible for hydroxyl radical or superoxide radical generated by the catalytic property of titanium dioxide to decompose wide variety of organic substances that cannot be decomposed by the ultraviolet rays.

In addition, if the titanium dioxide coating is applied on the sample contact surface, it is possible to prevent pollution also by an inorganic substance owing to the hydrophilic effect of the titanium dioxide.

As a result of this, it is possible to further improve the antifouling effect on the sample contact surface by making use of the synergistic effect of the irradiation of the ultraviolet rays and the catalytic effect of the titanium dioxide.

If making use of the synergistic effect of the ultraviolet rays and the titanium dioxide coating, it is possible to sufficiently produce the antifouling effect even though the light source that emits the ultraviolet rays of short wavelength or the ultraviolet rays of high light intensity is not used as the light source.

As a result of this, there is no need of using the light source that emits the ultraviolet rays of short wavelength or the ultraviolet rays of high light intensity so that it is also possible to reduce a manufacturing cost of the electrode device and to manufacture safer electrode devices.

Especially, for example, in case that a joined portion between the glass electrode enclosure 111 and the reference electrode enclosure 121 is uneven, it is conceived that the uneven portion is difficult to be irradiated by the ultraviolet rays.

It is possible to further improve the antifouling effect if the titanium dioxide coating is applied on a position where the irradiation intensity of the ultraviolet rays from the light source becomes less than a predetermined value due to a shape of the enclosure.

As the position on which the titanium dioxide coating is applied represented is, for example, a part or all of the sample contact surface, a part or all of the outside surface of the enclosure, the outside surface of the joined portion between the glass electrode enclosure 111 and the reference electrode enclosure 121 or the outside surface of the connecting portion between the glass electrode supporting tube 111a and the response glass 111b.

In case of using the reference electrode internal solution 124 to which KCl granules are added, the KCl granules might precipitate in the reference electrode internal solution 124 due to their own weight.

In this case, there is a risk that the ultraviolet rays emitted from the light source 311 fail to reach the sample contact surface of the enclosure because the ultraviolet rays are dispersed by the KCl granules.

Then, in case that the KCl granules are added to the reference electrode internal solution 124, a polymer gel whose transparency is high and that does not mingle with the polymer containing the KCl granules is put into a part locating between the light source 311 and the sample contact surface on which the ultraviolet rays from the light source 31 are to be irradiated, and a polymer gel that contains the KCl granules may be filled in the other part.

In order not to locate the KCl granules between the light source 311 and the sample contact surface, the liquid state internal solution and the polymer gel containing the KCl granules may be multilayered, or the position of the KCl granules may be adjusted by providing a bushing, a partition or a diaphragm that can keep conduction between the sample solution and the internal electrode for reference 122 in the inside of the reference electrode enclosure.

A shape of the LED chips is not limited to a cube shape or a rectangular parallelepiped shape, and may be various shapes such as a polygonal prism, a cylinder, a cone, a pyramid, a hemisphere and a shell shape.

A material of the enclosure is not limited to a transparent glass, and may be a transparent resin. The enclosure is not necessarily made of a transparent material especially in case that the light source 311 is mounted on outside of the enclosure.

The electrode device is not limited to a device that measures a pH or various ion concentrations, and may measure an oxidation-reduction potential or other electrochemical property of a sample.

The internal electrode for measurement 112 and the internal electrode for reference 122 in the above-mentioned embodiment use the silver/silver chloride electrode, however, it is not limited to this, and may use an electrode made of other component according to the usage.

The embodiment may be variously modified or combined without departing from the spirit of the invention.

Practical Example

This invention will be explained further in detail by referring to a practical example, however this invention is not limited to this example.

Figure 5:
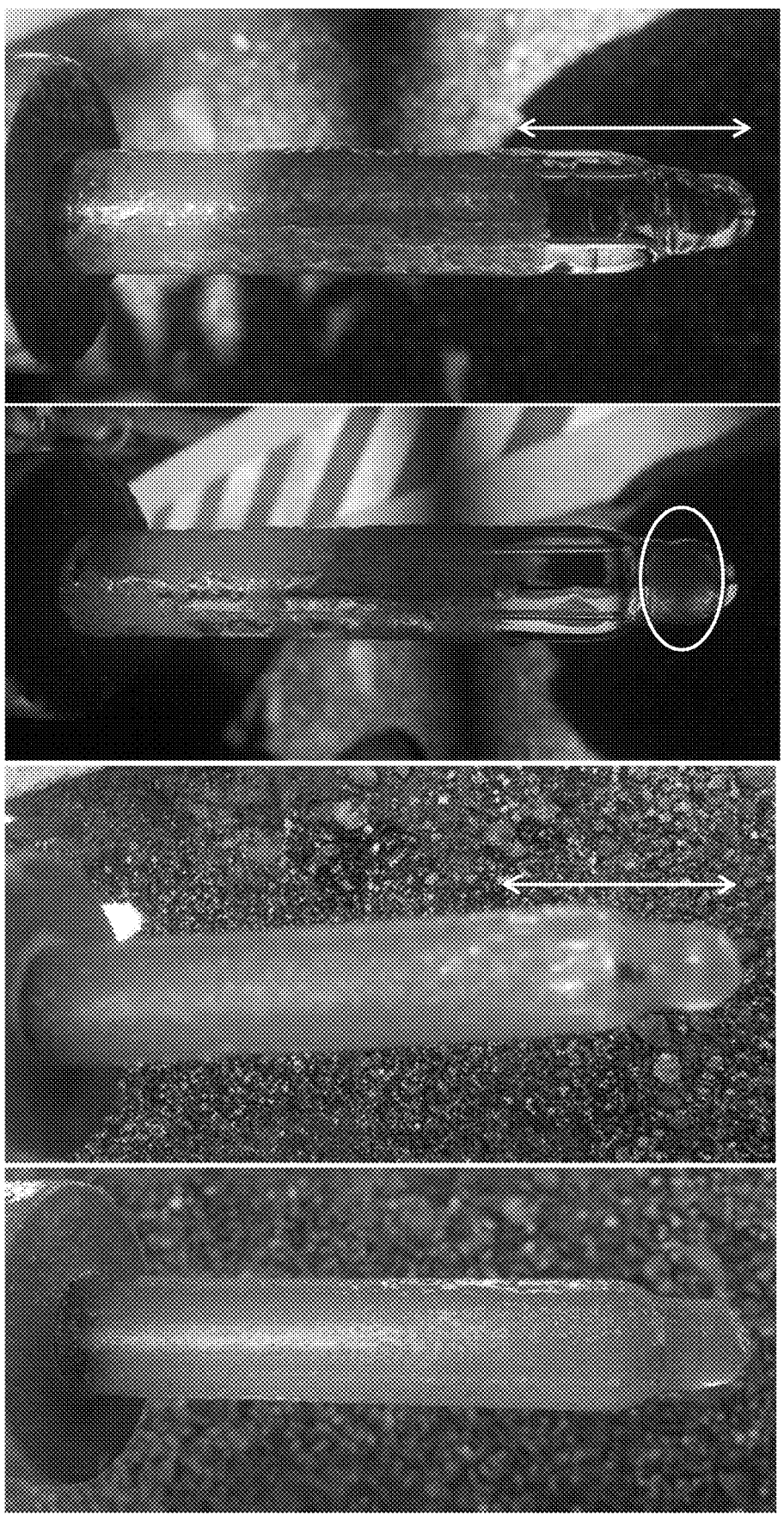
FIG. 5 shows at (a) through (d) several views illustrating an experimental result in accordance with one embodiment of this invention.

In this practical example, four composite electrodes (#6101) made by HORIBA, Ltd are prepared, and each of them is provided with the following FIG. 5 processing respectively.

In FIG. 5 at (a) no process is provided, in FIG. 5 at (b) only the titanium dioxide coating is applied, in FIG. 5 at (c) the light source that emits the ultraviolet rays is mounted on the inside of the glass electrode enclosure, and in FIG. 5 at (d) the titanium dioxide coating is applied and the light source is mounted on the inside of the glass electrode enclosure.

The composite electrodes at (b) and (d) of FIG. 5 are coated with titanium dioxide three times by a sol-gel method to a height indicated by a two-direction arrow in (b) and (d) of FIG. 5.

For the composite electrodes (c) and (d) of FIG. 5, as explained in detail in the first embodiment, the LED chips that emit the light whose wavelength is about 370 nm and whose light intensity is about 8 mW/cm$^2$ are mounted inside of the glass electrode.

Either of the response glass and the support tube glass constituting the glass electrode support tube and the reference electrode enclosure of the composite electrode used in this practical example has the following properties.

The response glass and the support tube glass contain one or more kinds of the material of 80 mol % or more that are selected from a group comprising $SiO_2$, $Al_2O_3$, $Li_2O$, $Na_2O$ and $K_2O$, one or more kinds of the material of 90 mol % that are selected from a group comprising $SiO_2$, $Al_2O_3$, an alkali metal oxide and an alkali earth metal oxide, and one or more kinds of the material of 95% mol % that are selected from a group comprising $SiO_2$, $Al_2O_3$, an alkali metal oxide, an alkali earth metal oxide, $B_2O_3$, a lead (Pb) oxide, $Y_2O_3$, $La_2O_3$, $Ta_2O_5$, $ZrO_2$ and $TiO_2$.

Either of the response glass and the support tube glass contains 1 mol % or less transition metal oxide such as chromium, manganese, iron, cobalt, nickel and copper as being a coloring matter, and 99 mol % or more oxide other than the transition metals.

The response glass and the support tube glass contain 97 mol % or more transparent composition such as a transparent metal oxide.

Photos of these four composite electrodes after used in a chemical factory in about one month will be shown in FIG. 5 at (a)-(d).

According the result shown in FIG. 5 at (a)-(d), stein attaches tightly to the surface that makes contact with the sample solution for the composite electrodes at (a) and (b) of FIG. 5 comprising no light source to emit the ultraviolet rays.

On the other hand, for the composite electrodes at (c) and (d) of FIG. 5 wherein the light source to emit the ultraviolet rays is mounted on the inside thereof, it has been turned out that almost no stein attaches to a part where the ultraviolet rays are irradiated among the surface of the two composite electrode enclosure.

According to these results of this experiment, it has been proved that the composite electrode wherein the light source that emits the ultraviolet rays is mounted inside of the enclosure can produce sufficient antifouling effect even though the enclosure is not provided with the titanium dioxide coating.

Since the composite electrode used in this practical example is a type wherein the joint portion between the glass electrode enclosure and the reference electrode enclosure is narrowed, there is a portion (a portion that is surrounded by a circle) on which the ultraviolet rays from the light source housed inside of the glass electrode enclosure are difficult to be irradiated so that a difference is generated in adhesion state of stein depending on whether there is the titanium dioxide coating or not.

According to the above results, it has been proved that a sufficient antifouling effect can be produced even though the enclosure is not provided with the titanium dioxide coating if the ultraviolet rays emitted by the light source can be irradiated on whole of the surface of the enclosure that makes contact with the sample solution.

DESCRIPTION OF THE REFERENCE CHARACTERS

100 . . . electrochemical measurement device
1 . . . electrode device
111b . . . response glass
123 . . . liquid junction
21 . . . information processing unit
3 . . . antifouling mechanism
311 . . . light source

The invention claimed is:

1. An electrode device comprising
an internal electrode covered by a UV (ultraviolet) absorbing material or a UV intercepting material,
an enclosure that houses the internal electrode,
an internal solution that is housed in the enclosure and that electrically communicates a liquid junction formed in the enclosure or a response glass that forms a part or all of the enclosure with the internal electrode, and
an antifouling mechanism that has a light source to irradiate ultraviolet rays on a sample contact surface of the enclosure as being a surface that makes contact with a sample and that prevents the sample contact surface of the enclosure from being polluted, wherein
the light source is directly or indirectly mounted on an outside of the enclosure, or the light source is housed inside of the enclosure.

2. The electrode device described in claim 1, wherein the enclosure and the internal solution have transparency, and the light source is housed inside of the enclosure.

3. The electrode device described in claim 1, wherein the light source is LED.

4. The electrode device described in claim 1, wherein the response glass contains 40 mol % or more silicon dioxide.

5. The electrode device described in claim 1, wherein the light source is so arranged to emit the light in a direction of the liquid junction.

6. The electrode device described in claim 1, wherein the enclosure is tubular, the light source is arranged at a position to irradiate the ultraviolet rays on the liquid junction or the response glass, and the internal electrode is arranged across a position of the light source on an opposite end side to an end of a side near the liquid junction or the response glass of the enclosure.

7. An electrochemical measurement device comprising the electrode device described in claim 1, and
an information processing circuit that receives an output signal from the electrode device and converts the received output signal into desired information and outputs the information.

8. The electrode device described in claim 1, wherein
a length of the enclosure includes a distal end at which the response glass or the liquid junction are arranged, a proximal end that is opposite to the distal end of the enclosure, and a midpoint that is half-way between the proximal end and the distal end along the length of the enclosure; and
the internal electrode is located in the enclosure at a position closer to the proximal end of the enclosure than the midpoint of the enclosure.

9. The electrode device described in claim 1, wherein
the internal electrode is a composite electrode comprising a measurement electrode, housed inside a glass electrode enclosure, and a reference electrode housed inside a reference electrode enclosure;
the glass electrode enclosure is surrounded by the reference electrode enclosure; and
the light source is disposed inside the glass electrode enclosure.

* * * * *